United States Patent [19]

McDermott, III

[11] Patent Number: 4,602,367

[45] Date of Patent: Jul. 22, 1986

[54] METHOD AND APPARATUS FOR FRAMING AND DEMULTIPLEXING MULTIPLEXED DIGITAL DATA

[75] Inventor: Thomas C. McDermott, III, Plano, Tex.

[73] Assignee: Rockwell International Corporation, El Segundo, Calif.

[21] Appl. No.: 644,489

[22] Filed: Aug. 27, 1984

[51] Int. Cl.$^4$ ............................ H04J 3/06; H04L 7/00
[52] U.S. Cl. .................................... 370/106; 370/108; 375/114
[58] Field of Search ...................... 370/100, 106, 108; 375/114, 116

[56] References Cited

U.S. PATENT DOCUMENTS

| | | | |
|---|---|---|---|
| 3,909,541 | 9/1975 | Bobilin | 370/100 |
| 4,247,936 | 1/1981 | Hustig | 370/100 |
| 4,416,009 | 11/1983 | Huffman et al. | 370/100 |
| 4,451,917 | 5/1984 | DeCoursey | 370/108 |
| 4,500,992 | 2/1985 | Fladerer | 370/100 |

Primary Examiner—Douglas W. Olms
Assistant Examiner—Wellington Chin
Attorney, Agent, or Firm—Bruce C. Lutz; V. Lawrence Sewell; H. Frederick Hamann

[57] ABSTRACT

If each data channel comprising a set of multiplexed data channels contains channel identity information, a single framing detector operating on one channel can provide a framing detection operation regardless of where the search is commenced thereby avoiding a search of all of the channels to obtain framing information. By having unique tag or identity bits incorporated in each of the multiplexed data channels, the timing problems for obtaining synchronized parallel output bits from each of the channels can be logically ascertained and the channels can be rerouted and individual channels of the rerouted channels can be time delayed to obtain the time synchronization.

4 Claims, 11 Drawing Figures

```
SENT    A1 B1 C1 A2 B2 C2 A3 B3 C3 · · ·

SWAP     DELAY    OUTPUT
RECEIVED      A1       A2       A3          X → A1     ∅        A1
CASE 1        B1       B2       B3          Y → B1     ∅        B1
              C1       C2       C3          Z → C1              C1
```

```
SENT    A1 B1 C1 A2 B2 C2 A3 B3 C3 · · ·

SWAP     DELAY    OUTPUT
RECEIVED      B1       B2       B3          X   A2     1        A1
CASE 2        C1       C2       C3          Y ╳ B1     ∅        B1
              A2       A3       A4          Z   C1              C1
```

```
SENT    A1 B1 C1 A2 B2 C2 A3 B3 C3 · · ·

SWAP     DELAY    OUTPUT
RECEIVED      C1       C2       C3          X   A2     1        A1
CASE 3        A2       A3       A4          Y ╳ B2     1        B1
              B2       B3       B4          Z   C1              C1
```

METHOD AND APPARATUS FOR FRAMING AND DEMULTIPLEXING MULTIPLEXED DIGITAL DATA

THE INVENTION

The present invention is generally related to electronics and more specifically to multiplexed data. Even more specifically, the invention is related to a method for initially framing a plurality of channels of data in a way such that initialization and accordingly frame and data synchronization can be quickly performed.

BACKGROUND

The typical method of framing detection in the prior art has been to embed framing information in one of the plurality of multiplexed data channels and then have the detector check each channel of information until it finds a set of data bits which uniquely indicate that they are framing bits. The channels are then synchronized using this information and any switching of channels or delaying is done subsequent thereto.

Such an approach can require the searching and attempted synchronization for each of the channels before finding the proper channel. One approach in attempting to speed up this process is to have three different frame detectors all operating simultaneously and whichever one finds the framing information overrides the information from the other detectors in rerouting and/or delaying the signals to obtain the proper time synchronous outputs.

Since only one channel in the referenced prior approach has the framing information, the timing of the various channels or the circular permutations of data can be easily and quickly determined. In other words, if the framing information is placed on channel A, it is immediately obvious that the next subsequent bit is a B channel bit and the next subsequent bit is a C channel bit.

The present invention places the framing information on all three channels and additionally inserts a channel identity code in the overhead data of the channel. Thus, when framing is accomplished, the identity is detected and if the channel happens to be channel C, the logic circuitry knows immediately that the next bit will be channel A. However, it is also apparent that the data bits A and B following are not time synchronous with the channel C data just detected but rather with the following channel C data. Thus, if the output data is to be time synchronous for use by a parallel data load, appropriate rerouting of the signals and delaying of one or more of the signals must be accomplished prior to outputting the data.

The circuitry for accomplishing the above provides the simplest type of channel data extraction from the multiplexed data along with simple logic circuitry for framing detection and switching or rerouting of the signals as compared to the prior art circuitry for accomplishing the same function at a much longer framing acquisition time.

It is thus an object of the present invention to provide an improved high speed approach to framing of digital data to be used in a multiplexed system and framing acquisition of the channels of that data at the receiving and demultiplexing end.

Other objects and advantages of the present invention may be ascertained from a reading of the specification and appended claims in conjunction with the drawings wherein:

Figure 2:
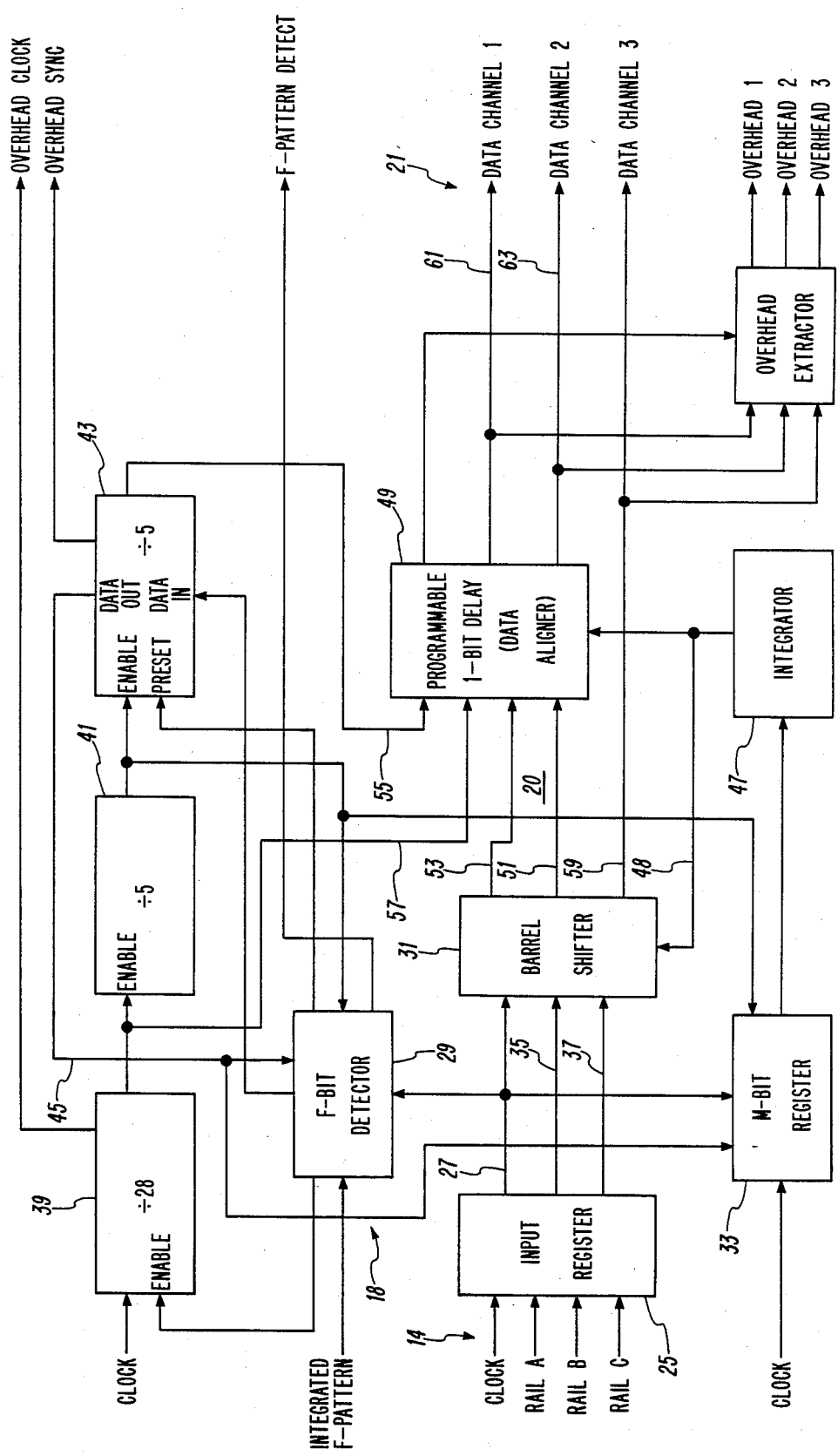
FIG. 2 is a more detailed block diagram of the circuitry of FIG. 1.
Figure 5:
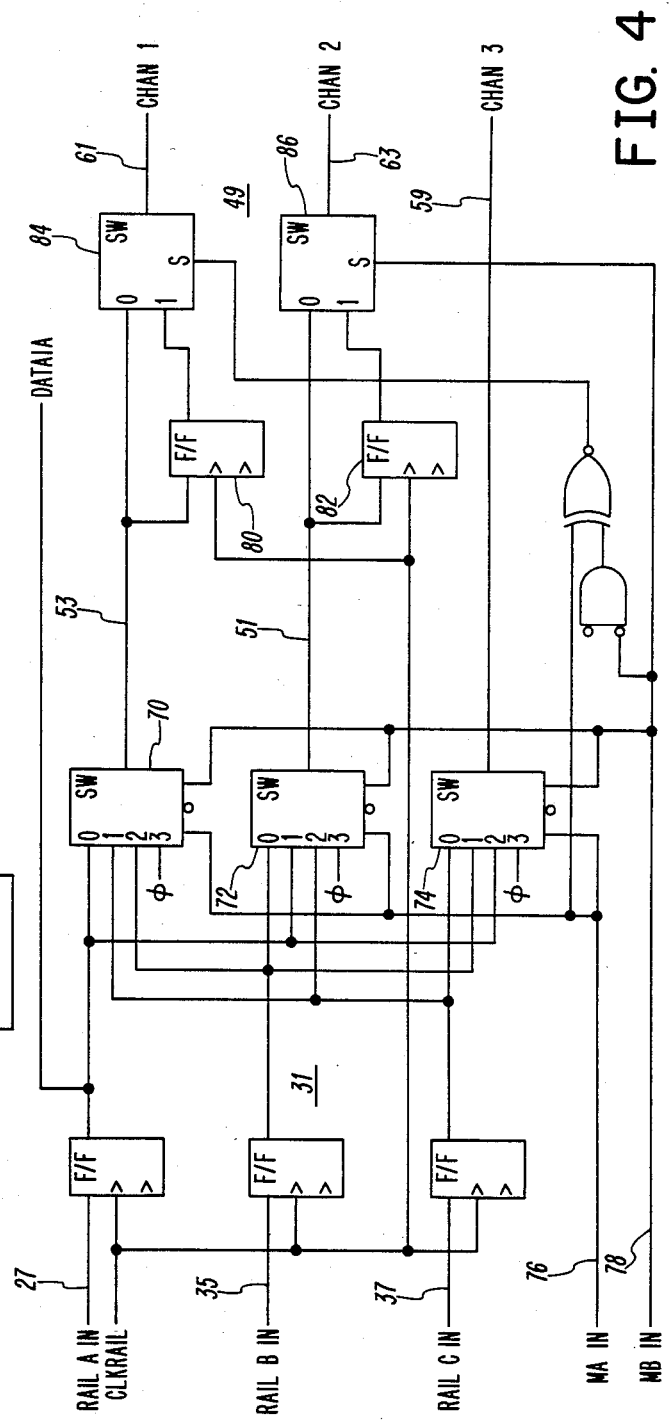
Figure 6:
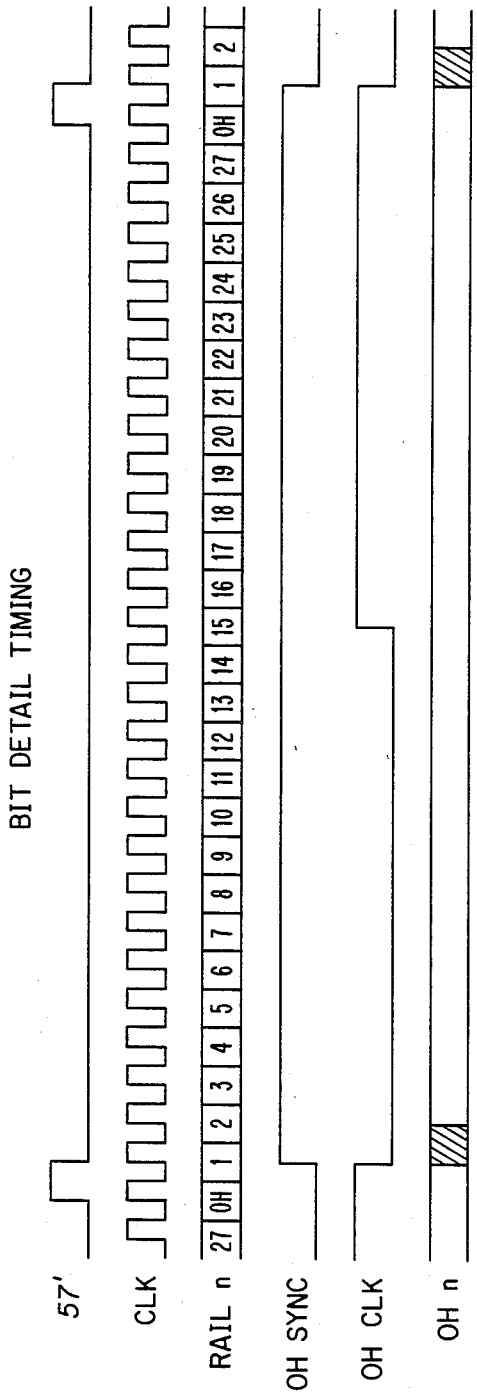
Figure 7:
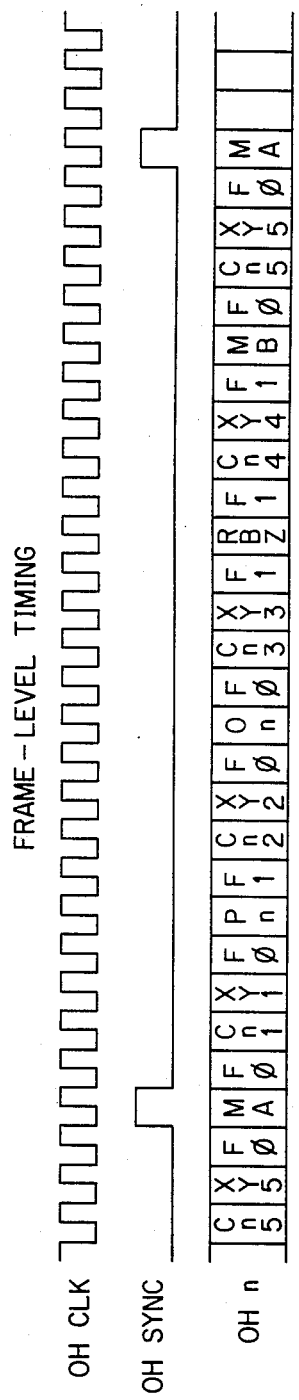
Figures 8, 9, 10, 11:
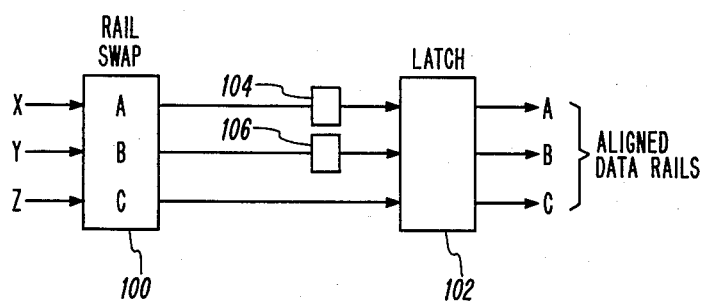

FIG. 5 comprises a table for ascertaining the delay characteristics from detected data at the receive end of the system;

FIG. 6 comprises a timing diagram of the high speed data at the bit level;

FIG. 7 is a timing diagram of the data at the frame level;

FIG. 8 is a table illustrating the receipt of data which is aligned and no swapping or rerouting of channels is required;

FIG. 9 illustrates an instance where the channel selected for detection requires a one bit delay on the channel a data and requires rerouting of the data channels;

FIG. 10 illustrates a situation where the rerouting of data is required along with a one bit delay for channel A and channel B data; and FIG. 11 is a block diagram illustrating in simplified form the operation of the barrel shifter and data delay of FIG. 2 and is used for explanation of FIGS. 8 through 10.

DETAILED DESCRIPTION

Figure 1:
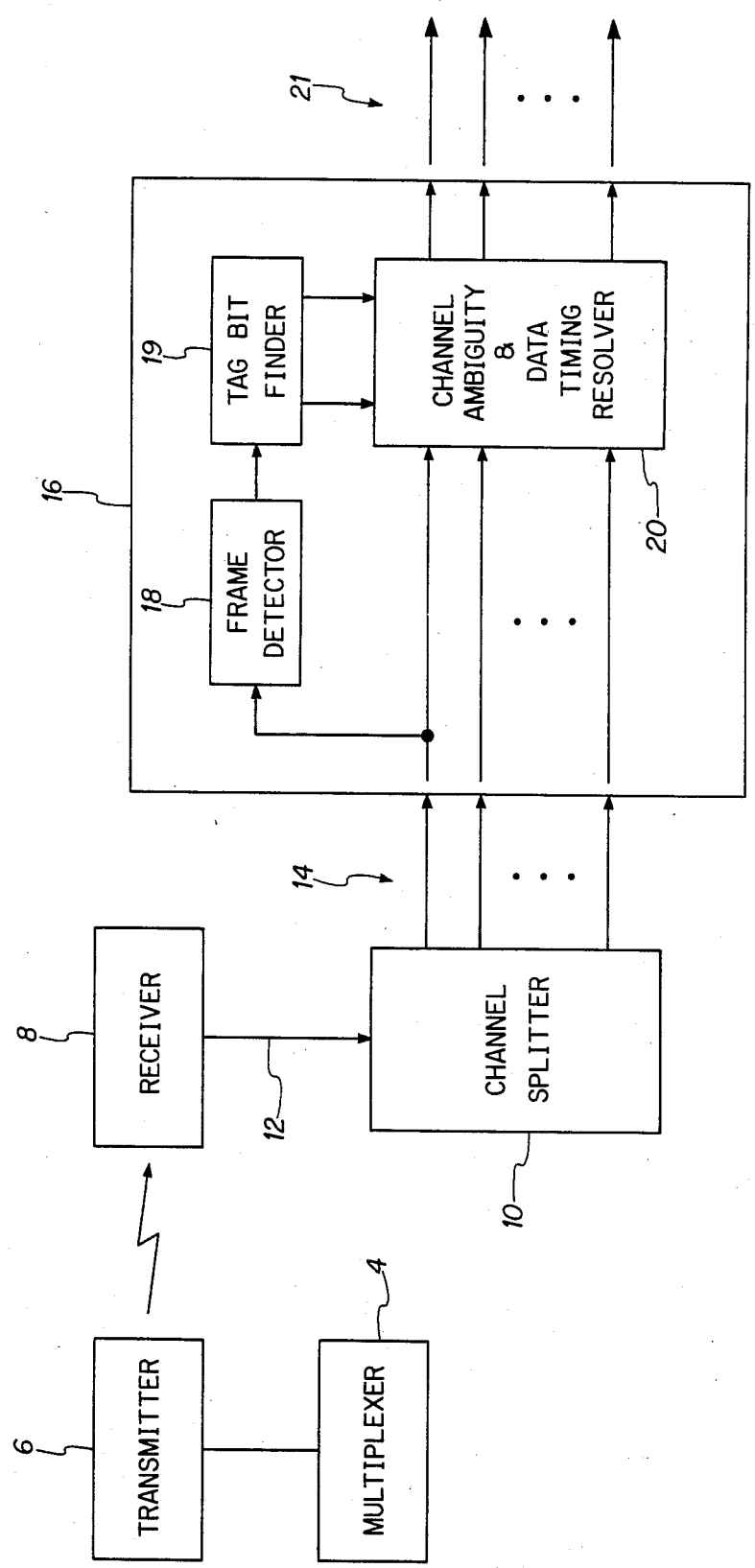
FIG. 1 is a block diagram of the overall system concept.

In FIG. 1 a remote multiplexer 4 and transmitter 6 is shown transmitting multiplexed data via a transmission medium to a receiver 8. The receiver 8 detects the signal and transmits it to a simple demultiplexer and channel splitter 10 on a lead 12. The signal is split and output as separate data channels on a plurality of leads 14. The order of the channels, in other words, ABC, BCA or CAB, is unknown. The plurality of data channels are supplied to a block 16 containing the inventive concept. The block 16, which may be termed a demultiplex framer, contains a frame detector 18, a tag bit finder or identity code detector 19 and a channel ambiguity and data timing resolver 20. The frame detector 18 is connected to one of the leads 14 and the output of this frame detector supplies information to the block 19 to tell it where it can find the identity code within the frame. Output signals from block 19 then indicate to the timing resolver which channel is being detected from the plurality of leads 14 and allows a rerouting of the signals within block 20 so that the output leads illustrated as 21 are time aligned and in the proper sequence. As shown, block 20 receives signals on the plurality of leads 14 and outputs those signals reconfigured and properly delayed on leads 21.

In FIG. 2 the same nomenclature is used where appropriate. The plurality of leads 14 are supplied to an input register 25 which provides output signals on a lead 27 to an F bit detector 29, a barrel shifter 31 and an M bit register 33. The input register 25 also supplies signals on an additional pair of leads 35 and 37 to the barrel shifter 31. The F bit detector 29 along with a plurality of divide blocks 39, 41 and 43 perform the functions of the frame detector 18 of FIG. 1. As shown, a signal is output by the divide by 5 block 43 on a lead 45 as a signal both to the F bit detector 29 and as an input to the M bit register 33. M bit register 33 in conjunction with an integrator 47 comprise the tag bit finder 19 of FIG. 1. As illustrated, after the identity of the channel being detected is ascertained, the signal is integrated to keep the value from changing suddenly due to momentary errors, and then output on a lead 48 both to the barrel shifter 31 and to a programmable one bit delay block 49. The barrel shifter 31 and block 49 comprise a substantial portion of the ambiguity resolver 20 of FIG. 1. As illustrated, the block 49 receives inputs on leads 51 and 53 from the barrel shifter 31 as well as receiving inputs on a lead 55 from divide by 5 block 43 and on lead 57 from divide by 28 block 39. Lead 57 is also used to enable the counter or divide by 5 block 41. The barrel shifter 31 also has an additional output on a lead 59 which supplies the third channel data signals directly to the apparatus output. The data on leads 51 and 53 are programmably delayed by block 49 and output on leads 61 and 63.

Figure 3:
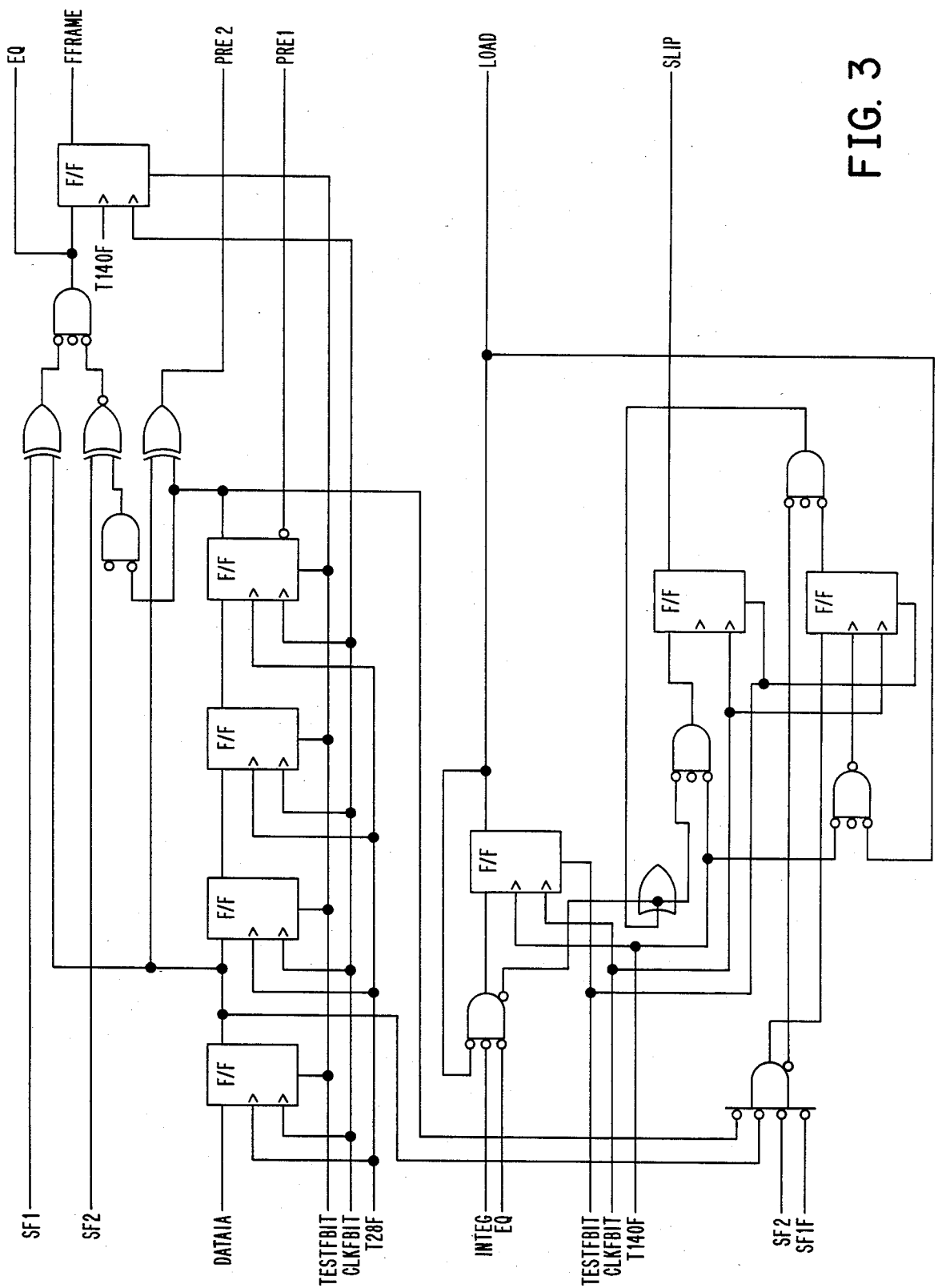
FIG. 3 is a detailed block diagram of the framing bit detector of FIG. 2.

FIG. 3 illustrates in more detail the F bit detector 29 of FIG. 2. Since this is only one possible method of detecting the f or frame bit of one channel of the multiplexed data being input to the system, no further comments will be made as to FIG. 3.

Figure 4:
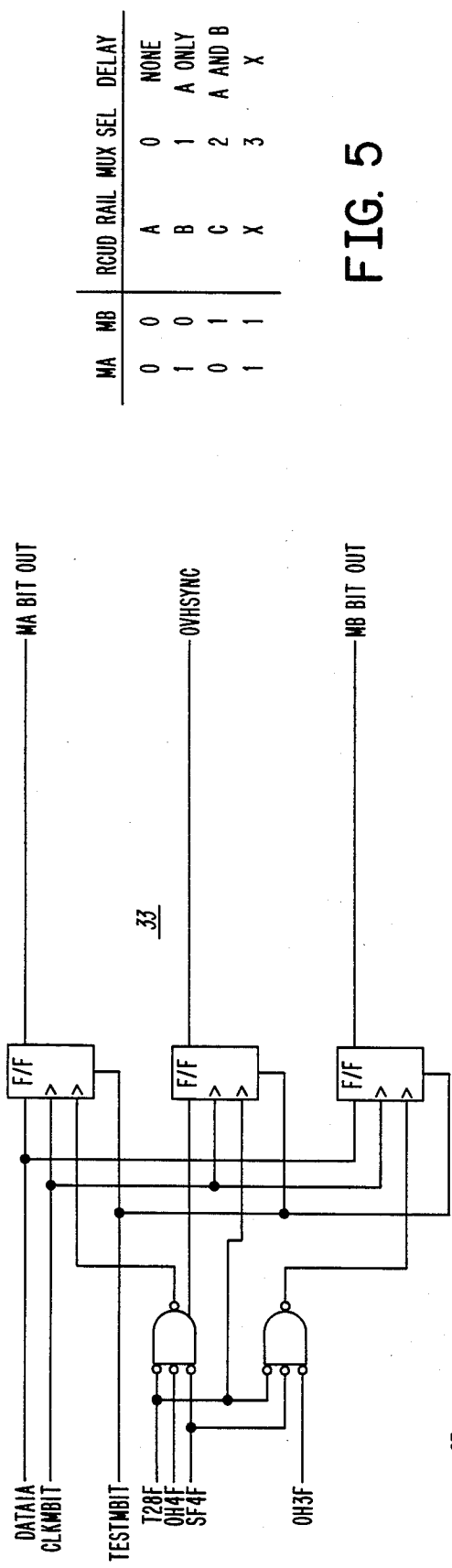
FIG. 4 is a detailed block diagram of the barrel shift and data alignment portion of FIG. 2.

FIG. 4 in the upper portion labeled 33 provides more detail as to the contents of the M bit register 33 of FIG. 2. The lower lefthand portion labeled 31 generally provides details as to the contents of barrel shifter 31 while the data alignment block 49 of FIG. 2 is shown in the lower righthand portion of FIG. 4. The integrator 47 is not illustrated. As illustrated, there are three selection blocks 70, 72 and 74, each of which receive the three data channels. Each of these blocks 70 through 74 also receive the output signals of the M bit register 33, after these signals have been integrated for stability, on leads 76 and 78. Since the integrator is not shown in FIG. 4, the leads 76 and 78 are not shown connected to the output of the M bit register 33 in the upper portion of FIG. 4. These two identity bit signals are applied to each of blocks 70 through 74 and the incoming A, B and C signals are rerouted as illustrated in the truth diagram of FIG. 5. The signals on leads 51 and 53 are applied to flip-flop circuits used as delay blocks 80 and 82 as well as to selection blocks 84 and 86 which determine whether or not the signals, as output on previously designated leads 61 and 63, will be delayed or not as also ascertained by the truth table of FIG. 5.

The truth table of FIG. 5 presents the various status possibilities of the signals on leads 76 and 78 and the resulting action. As illustrated, if the signals on leads 76 and 78 are both logic 0 then rail A was the channel selected and thus no delays or rerouting of the signals is necessary since all of the signals are in order and time synchronized. If, however, lead 71 is A logic 1 and lead 78 is a logic 0, the rail selected was B and thus the signals presented to input 1 of each of the selectors 70 through 74 is passed to the output and there is a delay only by delay unit 80 to place the data in channel 1 in time synchronism with the data in channels 2 and 3. Similar reasoning can be used for the remaining rail C and the last set of data is not used since there was only three rails of data in the embodiment of the invention as first reduced to practice.

The top waveform in FIG. 6 is representative of the output of block 39 of FIG. 2, or in other words, the input clock signal divided by 28 and is the clock signal appearing on lead 57. Thus, this waveform is given the designation 57'. The clock signal "CLK" is that input to block 39 as well as other devices in FIG. 2. The third waveform of FIG. 6 is labeled RAIL n and represents the data as input on any one of the RAILS A, B or C within the group of leads 14 applied to register 25. The next waveform is the overhead sync bit and represents the signal output by the divide by 5 block 43. The next waveform is a clock signal representing the overhead clock signal as output by the divide by 28 block 39. The final waveform of FIG. 6 represents the time during which an overhead bit is extracted by the overhead extractor block of FIG. 2. While the waveforms of FIG. 6 are bit detailed, the waveforms of FIG. 7 are on the frame level. Thus, the upper waveform is identical with the overhead clock waveform of FIG. 6. Likewise, the overhead sync bit waveform is identical with that of the overhead sync bit waveform of FIG. 6. The final waveform labeled "OH n" thus just contains overhead information bits and is representative of that material which has been extracted from the incoming data line 12 to the channel splitter block 10 of FIG. 1. The bits labeled F1 and F0 provide a unique combination of logic 1's and logic 0's and a unique combination of times of occurrences so that the framing signal can be adequately differentiated from any other overhead bit or data bit in the framing detection of block 18 of FIG. 1. The remaining labeled overhead bits are of no interest to the present inventive concept.

In FIG. 8 the top signal bit representation provides an indication of the data bits as multiplexed and ignores the possibility of overhead bits being inserted in between. The signal splitter removes these data bits in succession and places them on three separate lines and are shown as a first removal possibility where all of the A channel bits are on the upper line, the B channels bits are on the middle line and the C channel bits are on the third line. In such an instance, the identity code detector 18 of FIG. 1 would provide output signals such that no swapping would occur as illustrated by the next portion of FIG. 8 wherein each of the X, Y and Z lines are respectively connected to A, B and C. Further, there would be no delay as also illustrated by the table of FIG. 5 and thus the outputs to the first three bits received would be on lines 1, 2 and 3 as bits A1, B1 and C1.

In FIG. 9 a second possibility of receiving data and commencing synchronization is that the detection starts on a B data bit such that the upper line receives the B channel bits, the middle line receives the C channel bits and the lower line receives the A channel bits. In such a case, the identity code detector would cause a swapping in the block 70 through 74 of FIG. 4 in a manner shown under the swap section of FIG. 9 and delay the A channel bits so that there is time synchronization and parallel outputting of all of the channel data bits in the proper time sequence as illustrated.

The third receive possibility as illustrated in FIG. 10 has the upper channel receiving the C channel bits, the middle channel receiving the A channel bits and the lower channel receiving the B channel bits. In such an instance, the swap as indicated, would occur with the X channel bits being output on the lower line, the Y channel bits being output on the upper line and the Z channel bits being output on the middle line. When delays are applied to the top two lines, the output is again time synchronized as illustrated.

In FIG. 11 a block 100 represents the rail swapping capabilities of blocks 70, 72 and 74 in FIG. 4. A latch 102 in combination with programmable delays 104 and 106 perform the functions of 80 through 86 in FIG. 4. Applying this back to FIGS. 8 through 10, the rail swap 100 performs the swap function indicated in these figures while the delay is performed by blocks 104 and 106 and the latching is performed to maintain the output after the delay until the next bit is received to provide the time synchronization required.

OPERATION

As previously indicated, an object of the present invention is to reduce the time necessary to obtain time synchronization of data bits appearing at the output of a demultiplexer. One method of accomplishing this, would be to frame at a high data rate but there is an accompanying disadvantage that the circuitry must operate at such a high speed that it cannot economically be produced or produce reliable output. The present invention provides the fast synchronization while operating at the speed of a given channel data rate by including within the framing information a channel identity code so that once framing is accomplished, the identity of the channel can be immediately ascertained. If there are three channels of data, on the long term average, one third of the time the correct channel will be selected and the output will be time synchronized. The other two thirds of the time a reconnection can be accomplished within a switching network along with appropriate time delays for some of the channels in accordance with the identity of the channel that was randomly picked and time synchronization can be obtained very soon after frame synchronization is accomplished. In any event, it is still much faster than frame synchronizing two different channels let alone the possibility of having to try all three channels before finding the correct channel if the framing information is supplied on only one channel. The extra overhead required to insert framing information on all three channels is very small and increases the data rate only minutely.

The presentation of the A rail bit and then immediately time subsequent the presentation of the B rail bit and then the present rail bit and the repeating of this cycle is known as and is defined in this specification as a circular permutation relationship. In other words, the data bits from an informational standpoint always commence with A and continue through B and C before the presentation of another A bit. If occasionally the presentation was A, C and B, this would not be a circular permutation relationship.

As illustrated, in FIG. 1 the high speed multiplexed data comprising three channels of data in one embodiment is applied on lead 12 to the channel splitter 10. The three channels are output on leads 14. Depending on how the channel splitter happened to initiate reception, the upper lead may or may not have its output data bits in time synchronization with the remaining data bits. Reference to the top line of FIG. 8 will show that the incoming data for three channels would have the first bit for channel A, then the first bit for channel B and then the first bit for channel C. The next bit would be the second bit for channel A. Depending on how the channel splitter recognized the data, the upper lead could have any one of channel A, channel B or channel C bit and the remaining channels would have data as illustrated in the lefthand portion of FIGS. 8, 9 and 10. In other words, if channel C were the data bit on the upper lead, the other two leads would have the second bit for channels A and B. Since each of the channels has its own framing information, the frame detector 18 is able to provide framing information regardless of which channel is applied to the upper lead. Once the frame synchronization is obtained, the specific time to find the identity code is a predetermined value and thus the tag bit, or identity code finder 18 can detect the identity of the channel and apply signals to the channel ambiguity and data resolver 20 to delay some of the bits and switch the channels to provide time synchronization for the outputs on leads 20.

As briefly explained previously in the Detailed Description, if the received data is as shown in FIG. 8, no swapping is required, no delay is required and thus the output can be used as received. If, however, the configuration is, as shown, in the lefthand portion of FIG. 9 where the frame detector receives the first bit from channel B and the other two bits time synchronous as received from the channel splitter 10 are the first bit from channel C and the second bit from channel A, swapping will have to occur as shown under the swap section of FIG. 9 and a one bit time delay will have to be inserted for the A channel. Under these conditions, the outputs will have time synchronization of the data bits from each of the channels.

The situation in FIG. 10 is similar in that the frame detector is detecting channel C and after recognizing that fact, determines by logic that the swap shown in FIG. 10 is required and that channels A and B both require delay to obtain a time synchronized output.

FIG. 11 illustrates the swapping of channels or the reconfiguring or switching of the channels in block 100 while the delaying of the data bits is accomplished in blocks 104 and 106. The block 102 provides a latch to maintain the output until the next set of data is input.

FIG. 2 is reasonably self-explanatory in view of the Detailed Description. FIG. 2 accomplishes the functions shown within block 16 of FIG. 1. The data is input to the input register 25 and the upper line or the x line 27 is applied both to an M bit register for detecting the identity of the channel and to the F bit or frame bit detector 29. The clock is applied to the clock divider blocks 39, 41 and 43 and if a frame of bits is not detected within a prescribed time, an output is supplied from the F bit detector 29 to the block 39 to enable the divider to slip one bit and try again. When the frame is detected, the divider block 43 provides an output both to the F bit detector 29 and to the M bit register 33 on lead 45 providing an indication of where in the data stream the channel identity code can be found. In FIG. 7, the bits labeled MA and MB are those identity code bits as found in the frame level timing. With this information and in accordance with the truth diagram of FIG. 5, the identity of the channel can be ascertained. The barrel shifter 31 is the block that provides the swap functions of FIGS. 8 through 10 and the functions of block 100 of FIG. 11. The output of barrel shifter 31 on the upper two leads is supplied to the one bit delay block 49 to programmably delay these two signals as shown by blocks 104 and 106 of FIG. 11. The output of the M bit register 33 is integrated by block 47 before being returned to the logic which tells the barrel shifter 31 the configuration of the swapping and tells the one bit delay 49 which bits if any, to delay.

The F bit detector 29 shown in more detail in FIG. 3 is reasonably standard design and can be accomplished in any of many different ways. Therefore, further discussion will not be provided.

FIG. 4 was briefly mentioned in the Detailed Description and contains the M bit register 33 of FIG. 2 in the upper portion, the barrel shifter 31 in the lower lefthand portion and the one bit delay block 49 in the lower righthand section. Again, the circuitry is reasonably straightforward and is only one of many ways of accomplishing the desired result.

Although only one embodiment of the inventive concept has been illustrated, I wish to be limited not to that specific embodiment but only to the general inventive concept of generating framing information on each of the data channels at the transmit or multiplex end of a communication system so that at the receive end of the communication system, the time for frame synchronization and time synchronization of the output data bits can be provided in a minimal time by detecting the framing in any channel and as soon as framing is detected, determining the identity of the channel so that switching and delaying on a predetermined basis for the identified channel can be performed to provide the output signals without further resynchronizing steps of either the channel splitter or the frame detector.

I thus wish to be limited only by the scope of the appended claims wherein I claim.

1. Apparatus for demultiplexing multiplexed signals comprising, in combination:

first means for supplying a multiplexed signal comprising a plurality of data channels where each data channel includes framing information and an identity code embedded in the data of each of said data channels;

channel splitter second means, including output signal means and further including input means connected to said first means for receiving the multiplexed signal therefrom, for splitting the received signal into a plurality of data channels 1 to n;

signal switch third means, including apparatus signal output means, control signal input means and input means connected to said second means for receiving the data channels 1 to n therefrom, for routing signals between input and output in accordance with control signals supplied thereto; and detection fourth means, connected between said output means of said second means and said control input means of said third means, for detecting the identity code of one of the data channels output by said second means and supplying a control signal to said third means to reroute the data therethrough in accordance therewith.

2. Apparatus as claimed in claim 1 wherein said third means includes n-1 controlled signal delay means for controllably delaying the rerouted signals to provide time synchronization of data bits appearing in parallel at said output means of said third means.

3. The method of reducing frame acquisition time and data time synchronization of a multichannel multiplexed data signal where each data channel of the multiplexed data signal includes framing and channel identity information comprising the steps of:

splitting the multiplexed data into n separate data channels which have a predetermined circular permutation relationship;

detecting the channel identity of one of said n data channels;

time delaying data bits of some of n-1 of said data channels according to a predetermined algorithm if the identity of the detected channel is other than a given channel; and rerouting the channels as output to provide a set of time synchronized parallel output bits while maintaining said predetermined circular permutation relationship.

4. Apparatus for reducing frame acquisition time and data time synchronization of a multichannel multiplexed data signal where each data channel of the multiplexed data signal includes framing and channel identity information comprising, in combination:

first means for splitting the multiplexed data into n separate data channels which have a predetermined circular permutation relationship;

second means, connected to said first means and including control signal output means, for detecting the channel identity of one of said n separate data channels and outputting a control signal in accordance therewith; and third means, connected to said first means to receive the n data channels therefrom and to said second means to receive the control signal therefrom, for time delaying data bits of some of n-1 of said data channels, in accordance with said control signal, if the identity of the detected channel is other than a given channel and for rerouting the channels as output by said third means to provide a set of time synchronized parallel output bits while maintaining said predetermined circular permutation relationship.

* * * * *